United States Patent [19]
Shriner

[11] 3,736,727
[45] June 5, 1973

[54] AIR POLLUTION REDUCTION SYSTEM

[76] Inventor: Walter Shriner, 1409 Stevenson Drive, Springfield, Ill. 62703

[22] Filed: Oct. 6, 1971

[21] Appl. No.: 186,857

[52] U.S. Cl. ............... 55/103, 55/124, 55/136, 55/146, 55/155, 55/485, 55/516, 55/527, 55/DIG. 30, 60/275, 60/311, 55/131
[51] Int. Cl. .................................................. B03c 3/30
[58] Field of Search .................. 55/103, 131, 132, 55/155, 136, 137, 138, 128, 129, 485, 457, 523, DIG. 30, 124, 146, 516, 527; 131/261 R, 264, 10.7, 262 R, 262 A, 262 B; 60/275, 311

[56] References Cited

UNITED STATES PATENTS

| 2,918,139 | 12/1959 | Silverman | 55/457 X |
| 3,307,332 | 3/1967 | Grace et al. | 55/103 |
| 3,330,284 | 7/1967 | Seman et al. | 131/10.7 X |
| 3,394,707 | 7/1968 | Ellis | 131/264 X |
| 3,492,998 | 2/1970 | Mascaro | 131/261 R X |
| 3,545,179 | 12/1970 | Nelson et al. | 55/457 X |
| 3,563,004 | 2/1971 | Schouw | 55/103 |
| 1,632,325 | 6/1927 | Anderson | 55/466 |
| 2,758,666 | 8/1956 | Prentiss | 55/103 X |

FOREIGN PATENTS OR APPLICATIONS

| 680,297 | 10/1952 | Great Britain | 55/457 |
| 792,068 | 3/1958 | Great Britain | 55/103 |
| 104,528 | 5/1924 | Switzerland | 55/485 |

*Primary Examiner*—Dennis E. Talbert, Jr.
*Attorney*—Elmer L. Zwickel

[57] ABSTRACT

An air pollution reduction system embodying dielectric means to induce electrostatic forces in the path of a polluted fluid stream to cause precipitation of solids in said stream.

11 Claims, 9 Drawing Figures

PATENTED JUN 5 1973 3,736,727

AIR POLLUTION REDUCTION SYSTEM

The invention relates to an air pollution reduction system and is more particularly concerned with such a system wherein the removal of particulate and chemical pollutant contents of the fluid stream is obtained by precipitation of such matter through activation of an electrostatically charged field generated from a surface having dielectric properties disposed in the path of said stream.

As disclosed in my U.S. Pat. No. 3,587,210, issued June 28, 1971, it is common practice to separate and collect solid and liquid contaminating particles suspended in moving hot or cold gases by producing an electrical field within a chamber thorugh which said gases are moved. It appears that the very fine colloid particles which are entrained in the exhaust gases emitted from an internal combustion engine are especially conductive to the formation of smog conditions. Accordingly, coalescence of said entrained colloids are fine particulate material, so as to facilitate the entrapment thereof before discharge to the atmosphere, is of great significance in reducing smog producing conditions. To this end, the present invention incorporates novel means whereby the colloidally suspended pollutant particles of the pollutant-carrying fluid stream pass through a space containing air vanes capable of generating an electrostatic force which, when pplied to the particles in the fluid stream, cause said particles to be precipitated from said stream and collected in a collection chamber.

It is accordingly an object of this invention to provide a new and improved means for controlling and reducing the contaminant content of a pollutant carrying fluid stream.

Another object is to provide a self-contained air pollution reduction device for ready association with the exhaust system of an internal combustion engine or the like.

Another object of the invention is to provide a system for the treatment of a pollutant carrying fluid stream wherein a tubular unit in the path of said stream is provided with vanes constructed of or coated with a dielectric material susceptible to activation by the heat generated in an automobile exhaust system to establish and maintain an electrostatically charged surface on said vanes.

Another object is to provide a series of like tubular units joined in stacked relation end to end in alignment with the path of a pullutant carrying fluid stream wherein each of said units is provided with a series of circumferentially spaced vanes or air foils constructed of or coated with dielectric material effective to establish and maintain electrostatically charged fields effective to coalesce particulate matter in said fluid stream.

Another object is to provide a system which is applicable not only to the exhaust train of an internal combustion engine, but is also adapted for use in other installations such as smoke stacks, air conditioners, and similar sources of pollutant-carrying fluid streams.

Another object is to provide a device of the character referred to with novelly formed vanes or air-flows.

Another object resides in the provision of a system which is relatively inexpensive to manufacture and install and which requires a minimum of care and maintenance.

Other objects and advantages of the invention will become apparent with reference to the following description and accompanying drawings.

Figure 1:
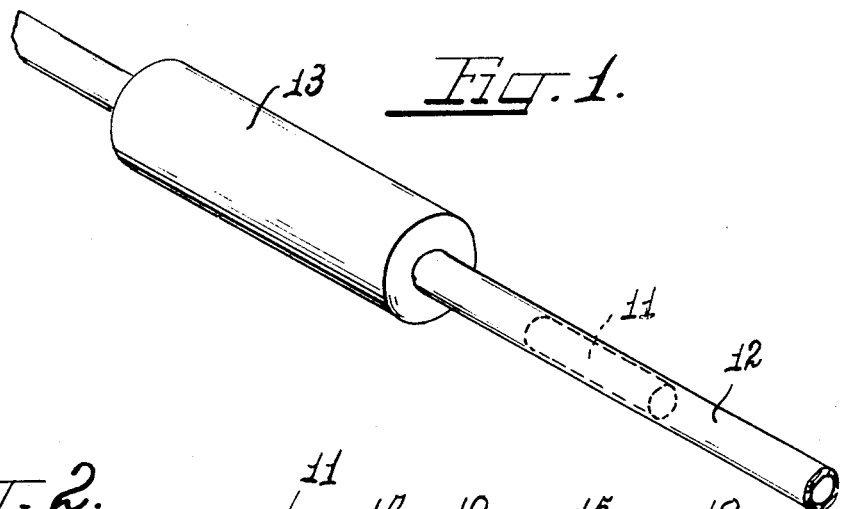
FIG. 1 is a view of an exemplary exhaust system of an internal combustion engine having installed therein the anti-pollution device of the present invention.
Figure 2:
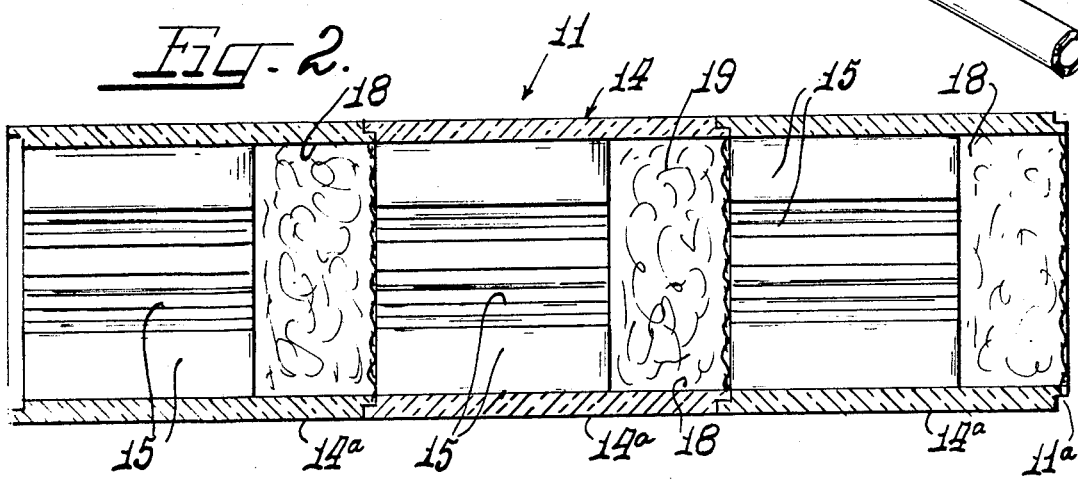
FIG. 2 is an enlarged longitudinal sectional view of the device.

As shown in FIG. 1 of the drawings, an air pollution reduction device 11 incorporating the features of this invention is shown as occupying a position in the tail pipe 12 of a typical internal combustion engine exhaust system including a muffler 13 to which the tail pipe 12 is joined in upstreamward relation to the device 11. Accordingly, when exhaust gases reach the device 11, much of the heat and pulse wave of such gases have been absorbed during passage through the muffler 13, which allows for miniaturizing the overall size of the device 11 as compared with one that would be required under conditions where the gases entered the device 11 at close to sonic velocities and maximum temperatures, with consequent loss in the operating efficiency of the device 11.

As shown, the device 11 comprises a cylindrical body 14 open at both ends. The body may be made of one piece but, as shown, preferably is comprised of a series of like units 14a which are nested together end-to-end so as to enable one to provide a device of any desired length depending upon its specific installation. Each unit is fabricated preferably from plastic, ceramics or even paper. The material used will be determined by the ultimate use to which the device is to be put. In the instance of muffler application, the material would preferably be ceramic or perhaps high heat resistant plastic so as to resist the heat of the gases; whereas, if the units are for use in filtering cold gases such as in an air conditioner, they may be fabricated from low heat resistant plastic or paper suitably treated as hereinafter noted.

Figures 3, 4, 5:
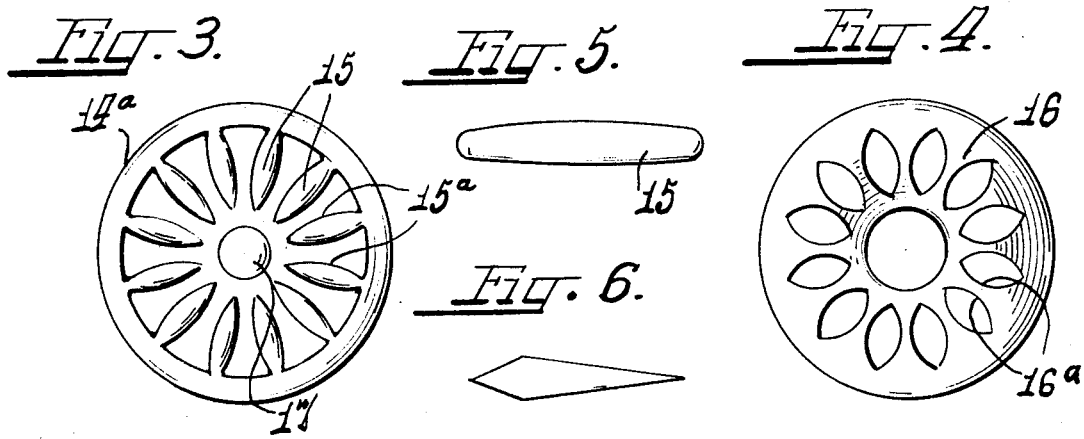
FIG. 3 is an end elevational view of the device.
FIG. 4 is a view similar to FIG. 3, showing a modified structure.
FIG. 5 is a detail of the vane in the FIG. 3 disclosure.
Figure 6:
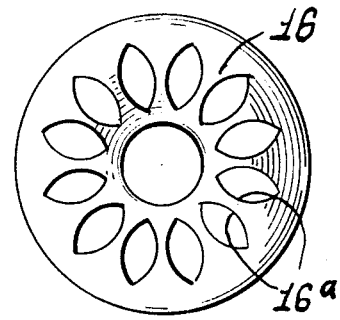
FIGS. 6 through 9 are views similar to FIG. 5, showing modified forms of vanes or air-flows.
Figure 7:
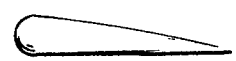
Figure 8:
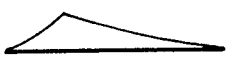
Figure 9:

In either event, the circular wall of each unit has intergral with it a plurality of radially arranged vanes 15 which may be suitably shaped as shown in FIGS. 3 or 4. In the FIG. 3 illustration the vanes 15 are formed with a thickened medial portion 15a and taper toward both ends. These may be termed "positive" vanes whereas, when shaped as shown at 16 in FIG. 4 ("negative" vanes) they are thinner in their medial portions 16a. It has been established by experiment that the "positive" type shape is more efficient than the "negative" type shape. The axial center of the unit may have an axial core such as shown at 17 in FIG. 3, or it may be left open as shown in FIG. 4.

When hot gases pass through the device when fabricated from ceramics, glazed or unglazed, and either coated with a thin layer of "Teflon" or not coated; or from a high temperature plastic, there is an electrostatic force generated on the vanes during the passage of exhaust gases through the device. This electrostatic force is effective to cause precipitation of the pollutants (solids) which are collected within collection chambers 18 containing shreaded or fibrous material 19, such as aluminum, spun glass, etc. Otherwise stated, the products of combustion pass through areas of voltage change and coalesce according to their collodial properties. As a result, the gases leaving the discharge end of the device are substantially free of pollutants.

In the present invention a series of like tubular units 14a of suitable size and shape are joined to form a rigid stacked assembly along a line extending lengthwise of the line of travel of the fluid stream which is associated with it. When thus joined in a rigid stacked assembly, the units are arranged in the exhaust pipe 12 in downstreamward relation to the muffler 13, so as to occupy a position in relation to the muffler corresponding to that illustrated in FIG. 1. In the instance of a plastic unit, each unit 14 is preferably molded of high temperature-resistance synthetic resinous composition such as phenolic resins or acrylic polymers. In either event the front end of each unit 14a is of reduced transverse diameter so as to provide an inwardly offset neck 11a about which the open rear end of each unit 14a rearwardly thereof has an external telescopic fit. The units 14a are secured in rigid stacked assembly by a cemented joint between each neck 11a and the portion of the adjacent unit enclosing said neck, or by other suitable connecting means. Thus, the exposed outer walls of each unit forms a smooth continuation of the corresponding wall of the other attached units. The number of such units 14a may be varied to suit the requirements of the installation to which the system is to be applied. In the event that the units are fabricated from porous material, such as ceramics, it is advisable to provide a layer of electric insulation material between the unit and the tail pipe.

Should paper be used to fabricate the units 14a, it is preferable that it be of a thickness of about 0.005 to 0.008 inch and that it be coated with shellac in ethanol; polyethylene in methyle ketone or a mixture of varnish, linseed oil and a thinner, as these substances have an electrostatic force generating potential.

It is to be observed that as an incident to the flow of a heated gaseous stream, in a path obstructed by the vanes 15 of each unit 11, the heat of such stream acting on the dielectric surface of the vanes of air-flows causes an electrostatically charged field or layer to be generated thereon. Under these conditions the particles of contaminant material in the fluid stream encountering said electrostatically conditioned field become charged so as to coalesce the collodial particles and render the same susceptible to entrapment of the particles. Preferably, the vanes are formed with reduced trailing edges as shown in FIGS. 6 through 9 to reduce sonic velocity.

As the fluid stream thus moves from unit 14a to unit 14a rearwardly thereof, the collodial effluent remaining in the fluid stream discharging from one unit onto another unit will undergo further action of the succeeding unit with the result that the fine particule size at the out-put end of the most downstream positioned unit 14a will produce a very substantial agglomeration of the particles in relation to the condition of such particles at the most upstream positioned unit 14a. Thus, when a quantity of collodial particles are collected in the collection chambers of each unit, said unit can be discarded and a new unit placed in the system.

While the electrostatic charged field in each of the units 14a is maintained in a hot gas exhaust system of an automobile internal combustion engine on the basis of the heat effects of such eshaust system applied to the vanes of each of said units, it is to be understood that such units are equally efficient in connection with installations, as for example, in the confines of a smoke stack. In such installations, facilities providing a source of initiation of the electrostatic field, such as auxiliary heating devices, could occupy a position at a suitable distance upsteam of the area occupied by the pollutant reduction unit 11 forming the subject of this invention.

A unit made of wood, for low heat application, functions very efficiently when the surfaces of the vanes are coated with shellac. When ceramics are used, should it be glazed, it may not be necessary to coat it with any dielectric material. However, it will be appreciated that by utilizing a relatively thin layer or coating of suitable synthetic resinous material such as "Teflon" (polytetrofluoroethylene) or other plastic material such as polystyrene, on the unglazed surface of at least the vanes 15–16, relatively high resistive surface conditions capable of easy activation in the generation of an electrostatic field may be obtained while using a relatively cheap and less resistive material such as ceramics for construction of the unit including the vanes. The use of such a coating thus provides a unit which is more economical to produce, without sacrificing the efficiency of the unit in the activation of the required elctrostatic field.

It has been found that the condensate collected in the unit is relatively dry having the appearance of a charred rock-like mass comprised of small gravel sized modules rather than as a tar as so often occures in devices of this general character. The collection of the precipitate as pellets is far suppeior to collection of fluids which, in a muffler installation, drip from the tailpipe onto the pavement.

Although I have described preferred embodiments of my invention in considerable detail, it will be understood that the description thereof is intended to be illustrative, rather thasn restrictive, as details of the structure may be modified or changed without departing from the spirit or scope of the invention. Accordingly, I do not desire to be restricted to the exact construction described.

I claim:

1. An air pollution reduction device for placement in the path of a pollutant-laden stream of gases comprising, in combination, a tubular body open at both ends, a plurality of stationary vanes radially arranged in the interior of said body, said vanes extending longitudinally of the body, and a coating of polytetrafluorethylene on the vane surfaces so as to be (present surfaces) capable of inducing electrostatic charges in the stream of gases flowing thereover.

2. The device recited in claim 1, in which the body is comprised of a series of units each containing vanes and which are nested together end to end.

3. The device recited in claim 2, in which each unit includes a collection chamber.

4. The device recited in claim 3, in which there is a mass of fibrous material in each collection chamber.

5. The device recited in claim 1, in which the vanes are uniformily spaced apart circumferentially.

6. An air pollution reduction device for placement in the path of a pollutant loaded stream of gases comprising, in combination, a tubular body comprised of a series of like units nested end to end and having an open gas inlet end and an open gas outlet end, a first series of stationary vanes disposed within said tubular body adjacent the inlet end, a collection chamber downstream from said vanes, a second series of stationary vanes disposed within said body in axial alignment with the first series of vanes, a second collection chamber downstream of said second series of vanes, a third series of stationary vanes in said tubular body in axial alignment with the second series, a third collection chamber downstream of said third series of vanes, the vanes in each series being uniformily spaced apart circumferentially and each having a surface of dielctric material, and a mass of fibrous material in each collection chamber, said vanes functioning to generate electrostatic charges in the gases passing thereover resulting in precipitation of pollutants which pollutants are collected in said chambers to remove said pollutants from the gases prior to passage to the outer atmosphere through the outlet end.

7. The device recited in claim 6, wherein the dielectric material is comprised of polytetrafluoroethylene.

8. The device recited in claim 6, in which at least the vanes are formed of ceramic material.

9. The device recited in claim 6, in which at least the vanes are formed of paper coated with a dielectric mateial.

10. The device recited in claim 6, in which the vanes have an ovoid configuration.

11. The device recited in claim 6, in which the vanes have an air-foil configuration.

* * * * *